(12) United States Patent
Asadi-Shahmirzadi et al.

(10) Patent No.: US 10,565,535 B2
(45) Date of Patent: Feb. 18, 2020

(54) SYSTEM HAVING INVENTORY ALLOCATION TOOL AND METHOD OF USING SAME

(71) Applicant: Wal-Mart Stores, Inc., Bentonville, AR (US)

(72) Inventors: Arash Asadi-Shahmirzadi, San Bruno, CA (US); Jagtej Bewli, San Mateo, CA (US); Arun Prasad Nagarathinam, Santa Clara, CA (US); David Win, San Francisco, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 951 days.

(21) Appl. No.: 14/566,452

(22) Filed: Dec. 10, 2014

(65) Prior Publication Data

US 2016/0171409 A1 Jun. 16, 2016

(51) Int. Cl.
*G06Q 10/06* (2012.01)
*G06Q 30/06* (2012.01)
*G06Q 10/08* (2012.01)

(52) U.S. Cl.
CPC ..... *G06Q 10/06315* (2013.01); *G06Q 10/087* (2013.01); *G06Q 30/0633* (2013.01)

(58) Field of Classification Search
CPC ................ G06Q 10/087; G06Q 10/08; G06Q 10/06315; G06Q 30/0633
USPC .................... 705/7.11, 7.12, 7.22, 7.25, 7.23
See application file for complete search history.

(56) References Cited

U.S. PATENT DOCUMENTS

| | | |
|---|---|---|
| 5,524,077 A | 6/1996 | Faaland et al. |
| 7,593,871 B1 | 9/2009 | Mesaros |
| 7,664,683 B2 | 2/2010 | Feldman et al. |
| 7,797,205 B2 | 9/2010 | Song et al. |
| 7,881,820 B2 | 2/2011 | Antony et al. |
| 8,239,237 B2 | 8/2012 | An et al. |
| 8,352,382 B1 | 1/2013 | Katta et al. |

(Continued)

OTHER PUBLICATIONS

Depth First Watch (Archived from Wayback Machine, Jan. 10, 2012—http://web.archive.org/web/20120110154306/http://en.widipedia.org/wiki/Depth-first_search) 5 pgs. Jan. 10, 2012.

(Continued)

*Primary Examiner* — Jamie H Austin
(74) *Attorney, Agent, or Firm* — Bryan Cave Leighton Paisner LLP

(57) ABSTRACT

A system and method includes a computer network system configured to provide output to a plurality of distribution centers for a retailer, an inputting system configured to allow ordering of a quantity of an item from a vendor having a minimum order quantity (MOQ) and vendor pack size for the item, an allocation system configured to allocate the order quantity based on an allocation policy including specific distribution centers and allocation percentages associated with the specific distribution centers, and an inventory allocation tool (IAT) configured to receive the allocation policy, order quantity, MOQ, and vendor pack size as inputs, optimizes distribution of the order quantity among the specific distribution centers so that MOQ and vendor pack size according to the allocation policy are respected, and outputs an executable purchase order over the computer network system for each specific distribution center.

21 Claims, 6 Drawing Sheets

(56) References Cited

U.S. PATENT DOCUMENTS

| | | | |
|---|---|---|---|
| 8,374,922 B1 | 2/2013 | Antony | |
| 8,438,052 B1 | 5/2013 | Chanda | |
| 8,527,373 B1 | 9/2013 | Ricci et al. | |
| 8,620,707 B1* | 12/2013 | Belyi | G06Q 10/087 705/28 |
| 2005/0267791 A1 | 12/2005 | LaVoie et al. | |
| 2007/0185786 A1 | 8/2007 | Ettl et al. | |
| 2007/0239297 A1 | 10/2007 | Degbotse et al. | |
| 2008/0086392 A1* | 4/2008 | Bishop | G06Q 10/08 705/28 |
| 2011/0145030 A1* | 6/2011 | Allen | G06Q 10/06 705/7.12 |
| 2011/0225023 A1* | 9/2011 | Evens | G06Q 10/087 705/7.31 |
| 2011/0295413 A1 | 12/2011 | Hara et al. | |
| 2012/0284083 A1 | 11/2012 | Wu et al. | |
| 2013/0018696 A1* | 1/2013 | Meldrum | G06Q 10/06 705/7.27 |
| 2013/0037613 A1 | 2/2013 | Soldate | |
| 2013/0046574 A1 | 2/2013 | Griep et al. | |
| 2014/0184818 A1 | 7/2014 | Argue et al. | |
| 2014/0222601 A1 | 8/2014 | Soldate | |
| 2014/0278627 A1 | 9/2014 | Grabovski et al. | |
| 2015/0032512 A1* | 1/2015 | Bateni | G06Q 30/0206 705/7.35 |
| 2015/0106224 A1 | 4/2015 | Stevens et al. | |

OTHER PUBLICATIONS

Dworak, David, D., Victory's Foundation: US logistical support of the Allied Mediterranean Campaign, 1942-1945, Syracuse University, ProQuest Dissertations Publishing, 2011 (3 pgs) 2011.

* cited by examiner

| Inbound | IAT (Inbound) | Transportation | Report | Reverse Logistics | Administrate | MCI Prom | SFS |

IAT Allocation Simulator

Enter your allocation parameters

UPC/WMItemNum/ItemId: 24099994
Order Quantity: 1000
MABD: 2014-12-25
Ship early: Y Submit

| | |
|---|---|
| Item ID | 24099994 |
| UPC | 0061021463207 |
| WM Item Num | 551394597 |
| MABD | 12-DEC-14 (from 12-DEC-14) |
| Name | T-Mobile Pre-Paid Nokia Lumia 521 4G Smartphone |
| Classification | C |
| Sub Category | NO CONTRACT PHONES (7604) |
| Category | WIRELESS DEVICES PRE PAID (7593) |
| Department | WIRELESS (9868) |
| Super Department | PHOTO AND WIRELESS (10185) |
| Division | GENERAL MERCHANDISE (7043) |
| Vendor Pack | 5 |
| MOQ | 5 - By V, Item, Level MOQ is 0, Volume MOQ by 153 is 1 rounded up to nearest vendor pack. |
| Vendor | T-MOBILE USA INC(732365870) |
| Ships on | Sundays Mondays Tuesdays Wednesdays Thursdays Fridays Saturdays |
| | N Y Y Y Y Y N |
| Allocation for the MABD | B |
| Index | 0 |
| Sub-Index | 0 |
| RH Time Period | FY15 Con Dec (1194) |
| RH Node | SUPER DEPARTMENT - PHOTO AND WIRELESS (10185) |

FIG. 3A

| Distributor | Vendor Derive Cancel | Cancel Date | Ship Date | Ship Date OK? | Facility Rank | On-Hand | On-Hand | Reserved | Item Configured for Distributor? | Index Allocation | RH Time Period Allocation |
|---|---|---|---|---|---|---|---|---|---|---|---|
| 2377 | 2 | 23-DEC-14 | 19-DEC-14 | Y | 6 | 0 | 0 | 0 | Y | | |
| 2378 | 2 | 23-DEC-14 | 19-DEC-14 | Y | 7 | 0 | 0 | 0 | Y | | |
| 2380 | 2 | 23-DEC-14 | 19-DEC-14 | Y | 10 | 0 | 0 | 0 | Y | | |
| 2383 | 2 | 23-DEC-14 | 19-DEC-14 | Y | 9 | 0 | 0 | 1 | Y | | |
| 4900 | 2 | 23-DEC-14 | 19-DEC-14 | Y | 33 | 0 | 0 | 0 | Y | | 16.25620902 |
| 803554 | 2 | 23-DEC-14 | 19-DEC-14 | Y | 14 | 0 | 0 | 0 | Y | | 6 |
| 511873052 | 2 | 23-DEC-14 | 19-DEC-14 | Y | 22 | 0 | 0 | 0 | Y | | 11.48758197 |
| 511873054 | 2 | 23-DEC-14 | 19-DEC-14 | Y | 21 | 0 | 0 | 0 | Y | | 10 |
| 511873055 | 2 | 23-DEC-14 | 19-DEC-14 | Y | 20 | 3 | 0 | 0 | Y | | 18 |
| 511873056 | 2 | 23-DEC-14 | 19-DEC-14 | Y | 19 | 0 | 0 | 0 | Y | | 8.3 |

FIG. 3B

| Chosen Allocation % (or parts) | Virtual OH for Chosen | Order | Virtual OH After Order | Actual Order by Vendor Pack | Remove Reason | Smart Alloc Item Pct | Smart Alloc Cat Pct | Allocation Choice Method |
|---|---|---|---|---|---|---|---|---|
| .04757 | 0 | 100 | 100 | 100 |  | .04757 |  | B |
| .03516 | 0 | 0 | 0 | 0 | MOQ Elimination | .03516 |  | B |
| .0062 | 0 | 0 | 0 | 0 | MOQ Elimination | .0062 |  | B |
| .28025 | -1 | 280 | 279 | 280 |  | .28025 |  | B |
| .23785 | 0 | 240 | 240 | 240 |  | .23785 |  | B |
| .01138 | 0 | 0 | 0 | 0 | MOQ Elimination | .01138 |  | B |
| .09928 | 0 | 100 | 100 | 100 |  | .09928 |  | B |
| .08066 | 0 | 100 | 100 | 100 |  | .08066 |  | B |
| .1758 | 3 | 180 | 183 | 180 |  | .1758 |  | B |
| .02585 | 0 | 0 | 0 | 0 | MOQ Elimination | .02585 |  | B |

FIG. 3C

SYSTEM HAVING INVENTORY ALLOCATION TOOL AND METHOD OF USING SAME

BACKGROUND OF THE INVENTION

1. Field of the Invention

The present invention relates generally to inventory allocation and, more particularly, to a system having an inventory allocation tool and method of using same.

2. Description of the Related Art

It is known that a large retailer typically has a number of retail stores with distribution centers located near groups of retail stores to supply inventory to the retail stores. For a large retailer, the collection of distribution centers may be referred to as a distribution network. Vendors typically supply the large retailer with items that are kept in inventory at the distribution centers, which subsequently distribute the items to the retail stores. In that regard, most vendors ship a number of the same items in a pack or vendor pack size and require the retailer to order a minimum quantity of the items at any one time. However, both the minimum order quantity and vendor pack size can vary by items and vendors, which constraints are imposed by vendors and are not constraints imposed by the retailer. A minimum order quantity (MOQ) is the least number of items that can be ordered from a vendor to get shipped to a specific distribution center. Since items shipped for a vendor come in packages, the number of items requested from a vendor must be a multiple of the vendor pack size.

To be efficient, a larger retailer may have an allocation policy for an inventory item for a given must arrive by date (MABD), which consists of a list of distribution centers and allocation percentages associated with each of them. When a Merchandise Planner team or automated replenishment system in the large retailer decides to order a quantity of an item for the specific MABD for the whole distribution network based on weeks of supply, inventory build up strategy for holidays or peaks or promotion offers, the order quantity of items gets distributed among the specific distribution centers in the distribution network so that it follows the allocation policy and vendor constraints (e.g., vendor pack size and minimum order quantity).

It is also known to provide an Inventory Allocation Tool (IAT) for a large retailer that takes into account the allocation policy, order quantity, minimum order quantity, and vendor pack size as inputs, and distributes the order quantity among the specific distribution centers recommended by the allocation policy so that the minimum order quantity and vendor pack size is respected as the IAT tries to follow the allocation percentages suggested by the allocation policy. The IAT is the last step of inventory allocation for the large retailer and its importance comes from the fact that the IAT produces an executable purchase order for each specific distribution center. Each specific distribution center takes the executable purchase order and orders the number of items from the vendor, who ships the items to the specific distribution center.

One disadvantage of the above-described IAT is that the IAT sometimes over orders items to satisfy vendor pack size constraints. For example, suppose the Merchandise Planner team would like to buy twenty (20) units of item A from a vendor which has a minimum order quantity of five (5) and a vendor pack size of five (5). Assuming the allocation policy is recommending three distribution centers ($D_1$, $D_2$, $D_3$) with allocation percentages (30%, 40%, 30%), respectively, there should ideally be (6, 8, 6) units in the distribution centers ($D_1$, $D_2$, $D_3$), respectively. However, the IAT over buys and produces purchase orders of size (10, 10, 10) for the distribution centers ($D_1$, $D_2$, $D_3$), respectively, to satisfy the allocation policy based on the vendor constraints. This results in more cost being imposed on the large retailer to order a quantity of an item greater than its sale forecast and also since each distribution center has limited storage capacity, having the extra volume of an item, will impact other items which need to be in the same distribution center.

Another disadvantage of the above-described IAT is that the IAT creates significant deviation from the allocation policy while trying to satisfy the minimum order quantity. This can get translated to allocating an item completely different from the allocation policy. For example, an item could end up in only one distribution center on the east coast when there are demands on the west cost or vice versa, which is extremely against the allocation policy which recommends distributing an item in both distribution centers. For example, suppose the Merchandise Planner team would like to buy twenty (20) units of an item A from a vendor which has a minimum order quantity of ten (10) and vendor pack size of two (2). Assuming the allocation policy is recommending two distribution centers ($D_1$, $D_2$) with an allocation percentage (40%, 60%), respectively, there should ideally be (8, 12) units in the distribution centers ($D_1$, $D_2$), respectively. The IAT produces purchase orders of size (0, 20) for the distribution centers ($D_1$, $D_2$), respectively. This potentially causes cross country shipping for the large retailer, which increases the cost of shipping and time of transit for the items.

It is, therefore, desirable to provide a new IAT which distributes an order quantity among distribution centers so that vendor constraints (e.g., minimum order quantity and vendor pack size) are respected. It is also desirable to provide a new IAT that does not over order items and brings the distribution of the order quantity closest to the distribution recommended by the allocation policy. It is further desirable to provide a new IAT that does not significantly deviate from the allocation policy. Thus, there is a need in the art to provide a system having a new IAT and method of using same that meets at least one of these desires.

SUMMARY OF THE INVENTION

Accordingly, the present invention provides a system including a computer network system configured to provide output to a plurality of distribution centers for a retailer and an inputting system configured to allow ordering of a quantity of an item from a vendor having a minimum order quantity (MOQ) and vendor pack size for the item. The system also includes an allocation system configured to allocate the order quantity based on an allocation policy including specific distribution centers and allocation percentages associated with the specific distribution centers. The system further includes an inventory allocation tool (IAT) configured to receive the allocation policy, order quantity, MOQ, and vendor pack size as inputs, optimizes distribution of the order quantity among the specific distribution centers so that MOQ and vendor pack size according to the allocation policy are respected, and outputs an executable purchase order over the computer network system for each specific distribution center.

In addition, the present invention provides a method including the steps of providing a computer network system for output to distribution centers of a retailer and ordering a quantity of an item from a vendor having a minimum order quantity (MOQ) and vendor pack size for the item. The method also includes the steps of providing an allocation policy for the item including specific distribution centers and allocation percentages associated with the specific distribution centers. The method further includes the steps of inputting into an inventory allocation tool (IAT) the allocation policy, order quantity, MOQ, and vendor pack size, optimizing distribution of the order quantity among the distribution centers so that MOQ and vendor pack size according to the allocation policy are respected, and outputting an executable purchase order over the computer network system for each specific distribution center.

One advantage of the present invention is that a new IAT is provided for a system and method of inventory allocation for distribution centers of a large retailer. Another advantage of the present invention is that the IAT includes an optimization process to optimize the order quantity so that an item is not over ordered and a distribution of the order quantity closest to the distribution center recommended by the allocation policy is produced. Yet another advantage of the present invention is that the IAT produces a distribution of the order quantity that does not significantly deviate from the allocation policy. Still another advantage of the present invention is that the IAT produces purchase orders that are more acceptable to an ideal allocation for the distribution centers.

Other features and advantages of the present invention will be readily appreciated, as the same becomes better understood, after reading the subsequent description taken in conjunction with the accompanying drawings.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIGS. 3A through 3C are an illustration of an exemplary screenshot of an interface for the system of FIG. 1, according to an embodiment of the present invention.

Figure 1:
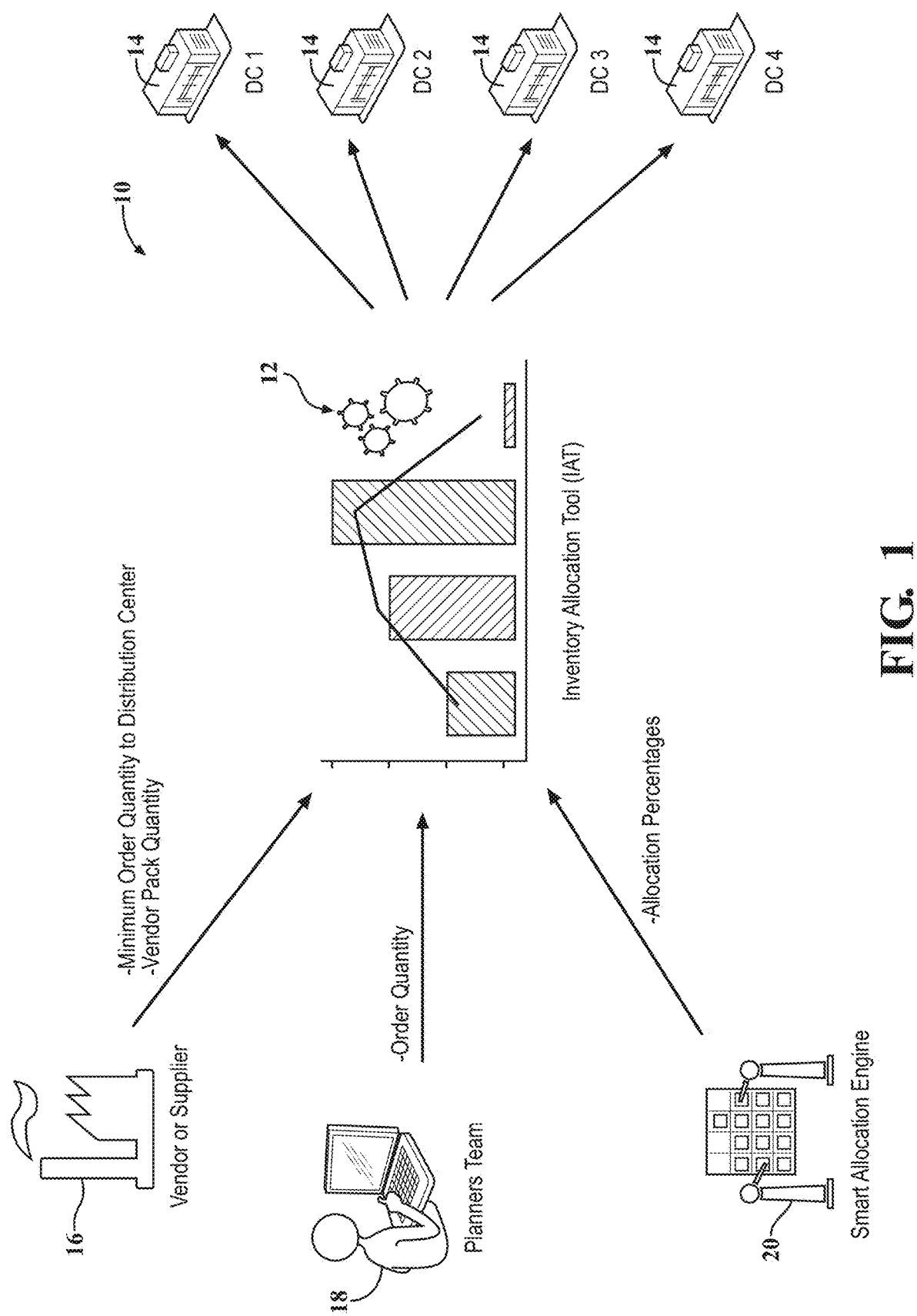
FIG. 1 is a diagrammatic view of a system incorporating an inventory allocation tool, according to one embodiment of the present invention.

Corresponding reference characters indicate corresponding components throughout the several views of the drawings Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION OF THE PREFERRED EMBODIMENT(S)

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis.

The disclosure particularly describes how a large retailer may order items online or remotely and produce executable purchase orders for distribution centers to order the items form a vendor and have the items delivered by the vendor to the distribution centers. Particularly, the present disclosure describes how a system associated with a large retailer allocates an order quantity of items to distribution centers and further to a method that allocates an order quantity of items to distribution centers.

With reference to the FIGS. and in operation, the present invention provides a system 10, methods and computer product media that facilitate the allocation of an order quantity to distribution centers of a retailer. In particular, the present invention has an inventory allocation tool that includes an optimization process that optimizes distribution of an order quantity of an item among the distribution centers according to an allocation policy.

Referring to FIG. 1, an exemplary environment in which the system 10 incorporating an inventory allocation tool 12, according to the present invention, operates is illustrated. The system 10 is configured for a large retailer having one or more distribution centers 14 and one or more vendors 16 who supply one or more items to the distribution centers 14. For a large retailer, the collection of distribution centers 14 may be referred to as a distribution network and the collection of vendors may be referred to as a vendor network. In the example illustrated in FIG. 1, the large retailer has four distribution centers 14 ($D_1$, $D_2$, $D_3$, $D_4$) and one vendor 16. The vendor 16 has a vendor pack quantity and minimum order quantity (MOQ) for an item to be ordered by the distribution centers 14, which is a known input used by the IAT 12. The system 10 may include an inputting system 18 that is configured to allow an automated replenishment system or a Merchandise Planners team to order a quantity of the item from the vendor 16. The inputting system 18 places an order quantity for an item, which is a known input used by the IAT 12. The system 10 further includes an allocation system 20 including a smart allocation engine or server having an allocation policy of the large retailer that allocates the order quantity of the item to specific distribution centers 14. The allocation system 20 is configured to use the allocation policy of the retailer with specific distribution centers and allocation percentages for the specific distribution centers 14, which is a known input used by the IAT 12. The IAT 12 uses the known inputs in an optimization process to be described to output executable purchase orders for the specific distribution centers 14. The IAT 12 resides on a computer network system (See FIG. 2) of the large retailer that communicates with the distribution centers 14, vendors 16, inputting system 18, and allocation system 20. It should be appreciated that the number of distributions centers 14, vendors 16, and items may vary as is known in the art. It should also be appreciated that, except for the new IAT 12, according to the present invention, the rest of the system 10 is known in the art. It should further be appreciated that the system 10 illustrated in FIG. 1 is not intended to limit the scope of the present invention. It should further be appreciated that the IAT 12 may be used with various other types of systems 10, not specifically shown herein, without departing from the scope of the present invention.

For clarity in discussing the various functions of the system 10, multiple computers and/or servers are discussed as performing different functions. These different computers (or servers) may, however, be implemented in multiple different ways such as modules within a single computer, as nodes of a computer system, etc. . . . The functions or performed by the system 10 (or nodes or modules) may be centralized or distributed in any suitable manner across the system 10 and its components, regardless of the location of specific hardware. Furthermore, specific components of the system 10 may be referenced using functional terminology in their names. The function terminology is used solely for purposes of naming convention and to distinguish one element from another in the following discussion. Unless otherwise specified, the name of an element conveys no specific functionality to the element or component.

Figure 2:
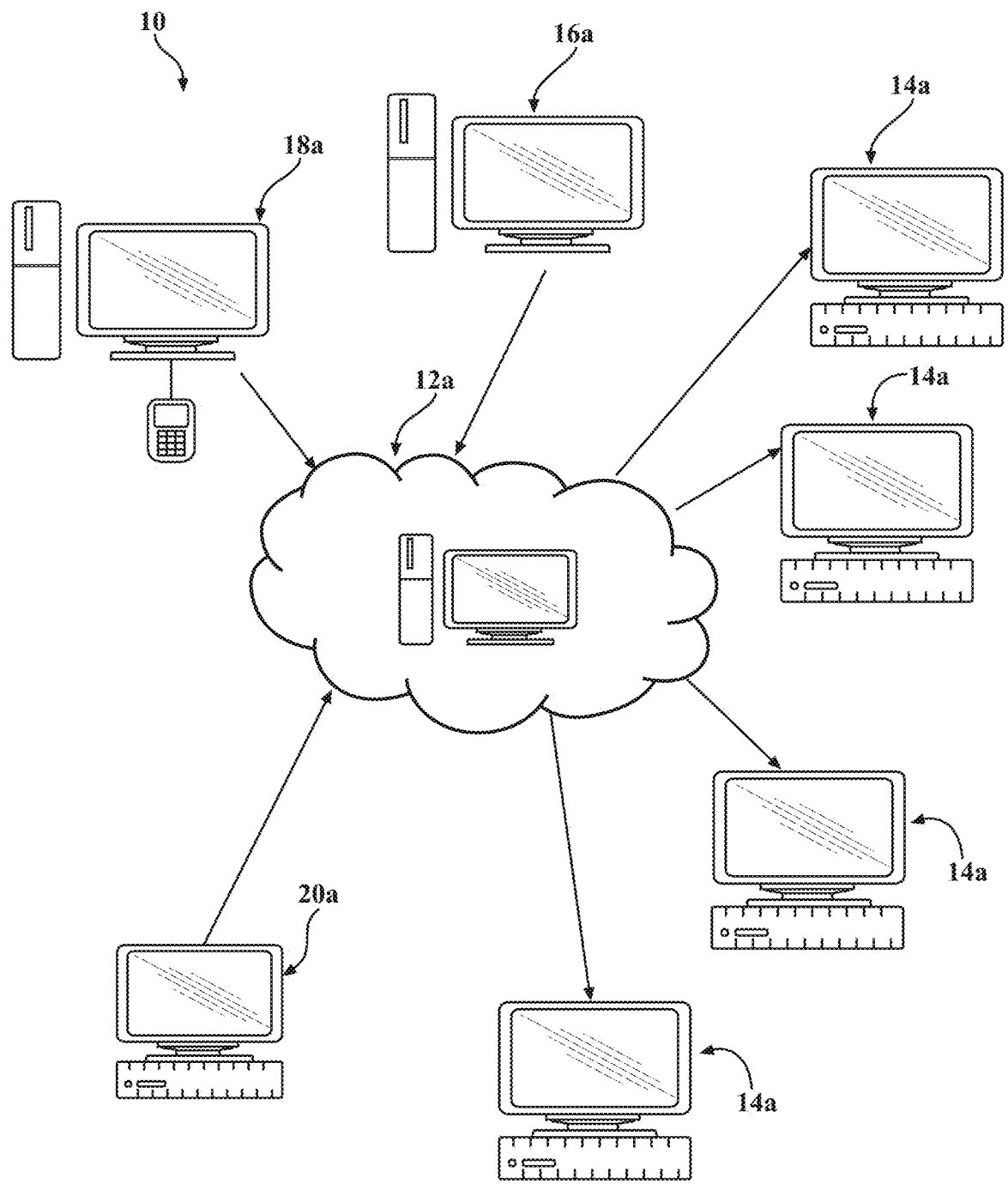
FIG. 2 is another diagrammatic view of the system of FIG. 1.

With specific reference to FIG. 2, the system 10 may include or have an associated first server or IAT server 12a. The IAT server 12a may include a computer having a memory, a processor, a display and user input mechanism. The IAT server 12a may include a database for storing information or be coupled to a database to access information. The IAT server 12 is configured to optimize allocation of the order quantity to be subsequently described. It should be appreciated that an optimization process is programmed in a suitable language such as JAVA on the IAT server 12a.

The system 10 may also include or have an associated second server or distribution server 14a associated with each distribution center 14. The distribution server 14a is coupled to the IAT server 12a for receiving executable purchaser orders from the IAT server 12a. It should be appreciated that the distribution server 14a may include the same or similar components as the IAT server 12a.

The system 10 may include or have an associated third server or vendor server 16a associated with each vendor 16. The vendor server 16a is coupled to the IAT server 12a for allowing a vendor 16 to input information into the IAT 12. The vendor server 16a allows the vendor 16 to interact with the IAT server 12a to input information of MOQ and vendor pack size for the item. It should be appreciated that the vendor server 16a may include the same or similar components as the IAT server 12a.

The system 10 may also include or have an associated fourth server or inputting server 18a. The inputting server 18a is coupled to the IAT server 12a for allowing the inputting system 18 to input information into the IAT 12. The inputting server 18a may host an interface, generally indicated at 22 in FIG. 3, which allows a member of the Merchandise Planner team to interact with the inputting server 18a to order a quantity of one or more items or goods from the vendor 16 for the distribution network. It should be appreciated that the inputting server 18a may include the same or similar components as the IAT server 12a.

The system 10 may further include or have an associated fifth server or allocation server 20a. The allocation server 20a is coupled to the IAT server 12a for allowing the allocation system 20 to input information into the IAT 12. The allocation server 20a may interact with the IAT 12 to input the allocation policy for the item such as the allocation percentages and specific distribution centers. It should be appreciated that the allocation server 20a may include the same or similar components as the IAT server 12a.

Referring to FIG. 2, in selected embodiments, the software, hardware, and associated components of the system 10 may be programmed and configured to implement one or more embodiments described herein. The system 10 may communicate with the servers 12a, 14a, 16a, 18a, and 20a via a communications device or a communications connection or network. The communications connection may be any suitable connection, including the Internet, file transfer protocol (FTP), an Intranet, LAN, a virtual private network (VPN), cellular networks . . . , etc. . . . , and may utilize any suitable or combination of technologies including, but not limited to wired and wireless connections, always on connections, connections made periodically, and connections made as needed. It should be appreciated that the communications device may include any suitable device, including, but not limited to, a desktop computer, a laptop or notebook computer, a tablet, a handheld mobile device including a cellular telephone, and the like. It should also be appreciated that the various aspects of the system 10 may be exemplified as software, modules, nodes, etc. of a computer or server.

Referring to FIGS. 3A through 3C, one embodiment of an interface, generally indicated at 22, for the inputting system 18 is shown. As illustrated, the interface 22 allows the inputting system 18 to input data for various parameters. For example, the user of the Merchandise Planner Team may input data for the Item ID, UPC, Item Number, MABD, Name of the item, Classification of the item, sub Category of the item, Department of the retailer, Super Department of the retailer, Division of the retailer, vendor pack size, MOQ of the vendor, Vendor name, Ships on date, allocation for the MABD, the index, sub-index, RH time period, and RH node as illustrated in FIG. 3A. As illustrated in FIGS. 3B and 3C, the IAT 12 uses these inputs to produce executable purchase orders for the distribution centers 14. It should be appreciated that the input parameters used may vary, without departing from the scope of the present invention. It should also be appreciated that the vendor 16 inputs the information related to the item.

Referring to FIGS. 1 and 2, the IAT 12 is configured to optimize the order quantity according to the allocation policy. The IAT 12 uses a minimum order quantity $c_{MDL}$, which is also called a minimum distribution center load, and a vendor pack size $c_{VPS}$. In one example, the inputting system 18 is willing to buy or order a quantity Q of item A, and $(p_1, \ldots, p_n)$ is the desired allocation percentage recommended from the allocation policy for the distribution centers 14 ($D_1, \ldots, D_n$), respectively. It is assumed that $p_i = 100$ and $p_i > 0$ for all $i = 1, \ldots, n$. The distribution centers 14 ($D_1, \ldots, D_n$) is a list of specific distribution centers with positive allocation percentages since there is no incentive to distribute item A among distribution centers which have zero allocation percentages. The desired allocation percentages translate to an ideal target configuration $T = (t_i, \ldots, t_n)$ where $t_i = Qp_i/100$. The $t_i$'s might not be an integer value. To find an optimal configuration $M = (m_1, \ldots, m_n)$ such that $m_i$ is an integer value and it is a multiple of the vendor pack and if $m_i > 0$ then $m_i$ is at least as large as the minimum order quantity, for all $i = 1, \ldots, n$, and further M is the closest configuration to the target configuration T in respect to the probability of missing an order which falls in distribution center $D_i$ with probability $p_i$ is minimum (see definition of $D(M//T)$ in Equation 1 to be described). It should be appreciated that the IAT 12 is configured to find the optimal configuration $M = (m_1, \ldots, m_n)$ (See below).

For the IAT 12, let $D = \{D_1, \ldots, D_n\}$ be the set of n distribution centers. A configuration $(x_1, \ldots, x_n)$ is a representation of the number of identical items sitting in each distribution center, i.e. $x_1 \geq 0$ items is in distribution center $D_i$, for $i = 1, \ldots, n$. It should be appreciated that $x_i$'s are nonnegative real values and are not necessary integers. It should also be appreciated that a configuration $(x_1, \ldots, x_n)$ is a valid configuration if $x_i$ is an integer and $x_i$ is a multiple of a positive constant integer $c_{VPS}$ and if $x_i > 0$ then $x_i \geq c_{MDL}$, for $i = 1, \ldots, n$ where $c_{MDL}$ is also a positive constant integer. It should further be appreciated that $c_{VPS}$ and $c_{MDL}$ is referred to as vendor pack size and minimum distribution center load constants, respectively. It should still further be appreciated that a configuration is valid if each distribution center in D is either empty or it contains at least $c_{MDL}$ items, and the number of items in the each nonempty distribution center is a multiple of $c_{VPS}$.

Let $\chi^{(x)}$ be the following function:

$$\chi(x) = \begin{cases} x & \text{if } x \geq 0, \\ 0 & \text{if } x < 0 \end{cases},$$

Given two configurations $M = (m_1, \ldots, m_n)$ and $T = (t_1, \ldots, t_n)$ where $t_i > 0$ for all $1 \leq i \leq n$, $\sum_{i=1}^{n} t_i = Q \geq 0$ and $\sum_{i=1}^{n} m_i \leq Q$ a non-symmetric distance between M and T is defined as follows:

$$D(M \| T) = \sum_{i=1}^{n} (t_i/Q) \chi((t_i - m_i)/t_i). \qquad (1)$$

T is referred to as the target configuration. It should be appreciated that a simple interpretation of the distance metric is defined in the above Equation 1. Suppose an order comes with probability distribution proportional to target configuration T, i.e. an order falls in distribution center i with probability $t_i/Q$. An order at distribution center i with probability $\chi((t_i - m_i)/t_i)$ may be missed. If $m_i \leq t_i$ then since there is not enough items in distribution center i then the chance of missing the order is $(t_i - m_i)/t_i$. It should be appreciated that $D(M \backslash\backslash T)$ represents the probability of missing an order based on the current configuration M and the target configuration T. It should also be appreciated that $0 \leq D(M \backslash\backslash T) \leq 1$.

Problem 3.1.

Let $T = (t_1, \ldots, t_n)$ be the target configuration where $\sum_{i=1}^{n} t_i = Q$ and Q is a positive integer. The objective of the problem is to find a valid configuration $M = (m_1, \ldots, m_n)$ such that $\sum_{i=1}^{n} m_i \leq Q$ and M is the closest configuration to T, to be more precise $D(M \backslash\backslash T)$ is minimum.

It should be appreciated that Q is assumed to be a multiple of $c_{VPS}$ and $Q \geq c_{MDL}$ because Q can be reduced to the closest multiple of $c_{VPS}$ without changing the solution and also it may not be able to distribute any items, therefore M=(0, . . . , 0) is the trivial solution.

Instead of solving Problem 3.1, a generalization of Problem 3.1 may be solved as follows:

Problem 3.2.

Let T=($t_1$, . . . , $t_n$) be a target configuration where $\Sigma_{i=1}^{n} t_i = Q$ and Q is a positive integer. Assume K is an integer such that 0≤K≤Q.

$$\text{minimize} \sum_{i=1}^{n} (t_i/Q)\chi((t_i - m_i)/t_i) \quad (2)$$

subject to:

$$\sum_{i=1}^{n} m_i = K$$

$m_i$ is multiple of $c_{VPS}$   for $i = 1, \ldots, n$
if $m_i > 0$ then $m_i \geq c_{MDL}$   for $i = 1, \ldots, n$
$m_i \geq 0$ is an integer   for $i = 1, \ldots, n$ It should be appreciated that the target configuration T and integer K are inputs of Problem 3.2, so the above problem is referred to by P(T,K). It should also be appreciated that an optimal solution of P(T,K) consists of a configuration M and the value D(M\\T), referred to as C(T,K) and V(T,K), respectively.

It should further be appreciated that an optimal solution of P(T,Q) is the answer for Problem 3.1, that's why Problem 3.2 is the generalization of Problem 3.1.

The following theorem is the key step toward solving Problem 3.2.

Theorem 3.1.

Let T=($t_1$, . . . , $t_n$) be a target configuration and $T^1$=($t_1$, . . . , $t_{n-1}$). Suppose $t_n$>0, $\Sigma_{i=1}^{n} t_i = Q \geq 0$ and $\Sigma_{i=1}^{n-1} t_i = Q^1$, i.e. $Q^1 + t_n = Q$. Assume 0≤K≤Q. then $$V(T, K) = \min\left\{ \left(\frac{Q'}{Q}\right) V(T^1, K-v) + \left(\frac{t_n}{Q}\right)\chi\left(\frac{t_n - v}{t_n}\right) \;\Big|\; v = 0 \text{ or,} \right. \quad (3)$$

$$\left. v \geq c_{MDL} \text{ and } v \text{ is a multiple of } c_{VPS} \right\}$$

Proof.

Let C(T,K)=($m_1$, . . . , $m_n$) and V(T,K)=D(M\\T) be an optimal solution of P(T,K). Based on the interpretation of D(M\\T) as the probability of missing an order based on the current configuration M and the target configuration T, an order is missed either in the last distribution center, or in the rest of distribution centers. It should be appreciated that the probability of an order falls in the last distribution center and is missed is $(t_n/Q) \times ((t_n - m_n)/t_n)$, and probability that an order falls in the rest of the distribution centers and is missed is $(Q^1/Q) V(T^1, K-m_n)$.

It should also be appreciated that Equation 3 exhaustively searches for the value v=$m_n$ to achieve the minimum, which is V(T, K).

Theorem 3.1 provides the building block for solving Problem 3.2 using dynamic programming. The optimization process described below uses dynamic programming technique to solve the above Problem 3.2. Theorem 3.1 repeatedly used in updating V(i,j) values in Equation 4. For the IAT 12, the running time of the optimization process is $O(n(K/c_{VPS})^2)$. The optimization process is described as follows:

Data:

Target configuration T=($t_1$, . . . , $t_n$), an integer K, minimum distribution center load $c_{MDL}$, vendor pack size $c_{VPS}$ Result:

Matrices L, and V, an optimal configuration M=($m_1$, . . . , $m_n$). Both L and V are n×(K+1) matrices where L(i,j) denotes the number of items in distribution center i in optimal configuration in distributing j items, and V(i,j) shows the minimum value of D(M\\T) where $m_1$=L(i, j), $m_l$=0 for all i<l, and $\Sigma_{l=1}^{n} m_l = j$.

Initialization:

V(1,j)=$\chi((t_1-j)/t_1)$ for all 0≤j≤K

V(i,j)=1 for all 1≤i≤n and 0≤j<$c_{MDL}$

Optimization Process:

```
for i = 2 to n with step size 1 do
|   q = Σ_{l=1}^{i} t_l
|   q' = q - t_i
|   for j = c_MDL to K with step size c_VPS do
|   |
|   |     V(i, j) = min{(q'/q)V(i-1, j-v) + (t_i/q)χ((t_i-v)/t_i)|   (4)
|   |
|   |     for all values of v such that v = 0 or,
|   |
|   |     c_MDL ≤ v ≤ j and v is a multiple of c_VPS}
|   |
|   |     L(i, j) = v* where v* minimizes the above equation,
|   |     i.e. Equation 4.
|   end
end
currentItemCount = K
for i = n to 1 with step size -1 do
|   m_i = L(i, currentItemCount)
|   currentItemCount = currentItemCount - m_i
end
return M = (m_1, . . . , m_n)
```

Figure 4:
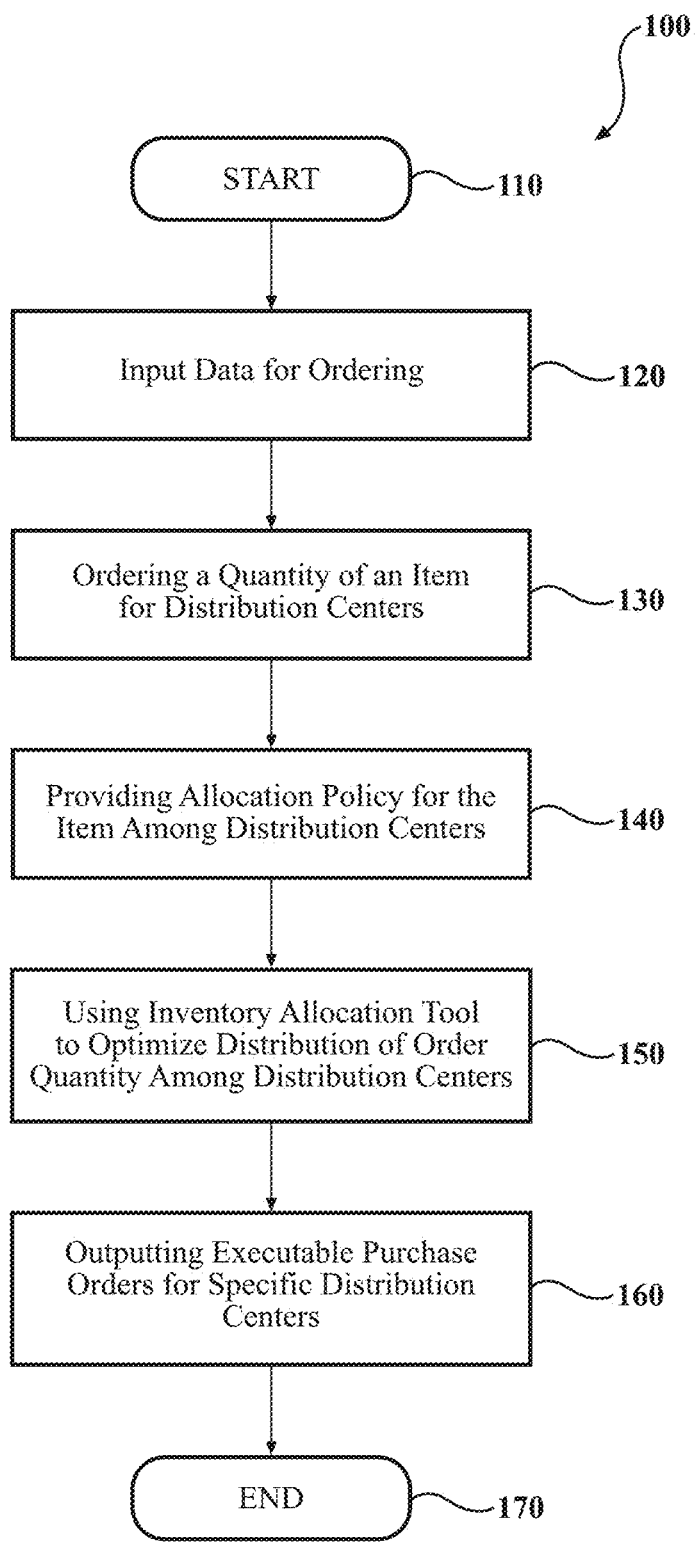
FIG. 4 is a flowchart of a method, according to one embodiment of the present invention, of using the system of FIGS. 1 through 3C.

Referring to FIG. 4, the present invention further provides a method, according to one embodiment of the present invention, of using the IAT 12 in the system 10. In general, a flowchart of the method, according to one embodiment of the present invention and generally shown at 100, starts in bubble 110. The method includes the steps of inputting data for ordering in block 120 and ordering a quantity of an item from a vendor having a minimum order quantity (MOQ) and vendor pack size for the item in block 130. The method also includes the steps of providing an allocation policy for the item including specific distribution centers and allocation percentages associated with the specific distribution centers in block 140. The method includes the steps of inputting into an inventory allocation tool (IAT) the allocation policy, order quantity, MOQ, and vendor pack size. The method includes the steps of using the IAT 12 and optimizing distribution of the order quantity among the distribution centers so that MOQ and vendor pack size according to the allocation policy are respected in block 150. The method includes the steps of outputting an executable purchase order for each specific distribution center using the IAT 12 in block 160. The method ends in block 170. It should be appreciated that the method includes other steps such as providing the computer network system and servers and coupling the servers to one another. It should also be appreciated that the specific distribution centers 14 order the number of items from the vendor according to the executable purchase order for that specific distribution center.

The IAT 12 of the present invention optimizes the distribution of the order quantity among the distribution centers so that it respects MOQ and vendor pack size according to the allocation policy. In one example, suppose the Merchandise Planner team would like to buy twenty (20) units of item A from a vendor which has a minimum order quantity of five (5) and a vendor pack size of five (5). Assuming the allocation policy is recommending three distribution centers ($D_1$, $D_2$, $D_3$) with allocation percentages (30%, 40%, 30%), respectively, there should ideally be (6, 8, 6) units in the distribution centers ($D_1$, $D_2$, $D_3$), respectively. The IAT 12 of the present invention buys and produces purchase orders of size (5, 10, 5) for the distribution centers ($D_1$, $D_2$, $D_3$), respectively, to satisfy the allocation policy based on the vendor constraints. It should be appreciated that the IAT 12 does not over order and orders exactly 20 units.

In another example, suppose the Merchandise Planner team would like to buy twenty (20) units of an item A from a vendor which has a minimum order quantity of ten (10) and vendor pack size of two (2). Assuming the allocation policy is recommending two distribution centers ($D_1$, $D_2$) with an allocation percentage (40%, 60%), respectively, there should ideally be (8, 12) units in the distribution centers ($D_1$, $D_2$), respectively. The IAT 12 produces purchase orders of size (10, 10) for the distribution centers ($D_1$, $D_2$), respectively, which is more acceptable to the ideal allocation (8, 12), specifically if $D_1$ is located on the east coast and $D_2$ is located on the west coast. It should further be appreciated that system 10 may be operated by various other methods, not specifically described herein.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A system comprising:
   a computer network system of a retailer configured to provide output for the retailer having one or more distribution centers and one or more vendors to supply one or more items to the one or more distribution centers, the computer network system comprising an allocation server in data communication with an inventory allocation tool server (IAT server) to allow an allocation system to input information into an inventory allocation tool (IAT) that uses an optimization process, wherein the output comprises an executable purchase order;
   an inputting system configured to allow an automated replenishment system to order an order quantity of an item of the one or more items from a vendor of the one or more vendors based on vendor constraints comprising a minimum order quantity (MOQ) and a vendor pack size for the item; and
   the allocation system, the allocation system comprising a smart allocation engine configured to apply one or more allocation policies of the retailer applicable to the one or more items, the allocation system configured to allocate the order quantity of the item based on an allocation policy of the one or more allocation policies of the retailer, the allocation policy comprising constraints for a distribution of the order quantity of the item to specific distribution centers of the one or more distribution centers based on allocation percentages associated with the one or more distribution centers and quantities of the item as determined in the allocation policy for the item associated with the specific distribution centers of the one or more distribution centers, wherein the IAT is configured to:
   (a) receive, via the smart allocation engine, the allocation policy of the retailer, the allocation policy comprising the allocation percentages for the item to be allocated to each of the specific distribution centers of the one or more distribution centers;
   (b) receive the order quantity of the item based on the vendor constraints for the one or more items to be ordered, wherein the vendor constraints comprise the MOQ and the vendor pack size as inputs;
   (c) receive the optimization process configured to optimize the distribution of the order quantity of the item among the specific distribution centers that prioritizes the distribution of the order quantity based on the vendor constraints over the allocation percentages in the allocation policy when following the allocation percentages requires ordering a larger quantity of the item than is recommended by the allocation policy, wherein the system deviates from the allocation percentages in the allocation policy by adjusting the allocation percentages based on the vendor constraints; and
   (d) output the executable purchase order over the computer network system for each of the specific distribution centers of the one or more distribution centers, wherein the order quantity of the item ordered is within a recommended quantity of the allocation policy.

2. The system, as set forth in claim 1, further comprising the IAT server, wherein the IAT server comprises the IAT and is in data communication with the one or more distribution centers.

3. The system, as set forth in claim 2, wherein the computer network system further comprises a distribution server for each distribution center of the one or more distribution centers coupled to the IAT server to allow each distribution center to receive an output of the IAT as the executable purchase order for the each distribution center that ordered the item.

4. The system, as set forth in claim 2, wherein the inputting system further comprises a merchandise planner team comprising an inputting server coupled to the IAT to allow either one of the automated replenishment system or the merchandise planner team to input the order quantity of the item.

5. The system, as set forth in claim 2, wherein:
   the allocation system is in data communication with the allocation server coupled to the IAT server; and
   the IAT server is further configured to recommend the allocation percentages for the specific distribution centers to be inputted for the item of the one or more items.

6. The system, as set forth in claim 2, further comprising a vendor server in data communication with the IAT server to allow the vendor of the one or more vendors to input the MOQ and the vendor pack size for the item of the one or more items.

7. The system, as set forth in claim 2, wherein the IAT server incorporates the optimization process to find an optimal configuration (M) for the order quantity.

8. The system, as set forth in claim 7, wherein the optimization process solves a problem recursively, to fill up two matrices L, V that when fully filled leads to an optimal solution comprising a two nested loop, where M is used for both current configurations for a sub-problem related to i,j, wherein the two nested loop in the optimization process is depicted as:

```
for i = 2 to n with step size 1 do
|   q = Σ_{l=1}^{i} t_l
|   q' = q - t_i
|   for j = c_MDL to K with step size c_VPS do
```

$$V(i, j) = \min\left\{\left(\frac{q'}{q}\right)V(i-1, j-v) + \left(\frac{t_i}{q}\right)\chi\left(\frac{t_i - v}{t_i}\right)\right\} \quad (4)$$

```
|   |   for all values of v such that v = 0 or,
|   |   c_MDL ≤ v ≤ j and v is a multiple of c_VPS}
|   |   L(i, j) = v* where v* minimizes the above equation,
|   |   i.e. Equation 4.
|   end
end
currentItemCount = K
for i = n to 1 with step size -1 do
|   m_i = L(i, currentItemCount)
|   currentItemCount = currentItemCount - m_i
end
return M = (m_1, . . . , m_n)
``` wherein the IAT uses a minimum order quantity $C_{MDL}$ and a vendor pack size $C_{VPS}$ to find the optimal configuration $M=(m_1, \ldots, m_n)$ such that $m_i$ is an integer value and is a multiple of the vendor pack size $C_{VPS}$, and if $m_i > 0$ then $m_i$ is at least as large the MOQ, for all $i=1, \ldots, n$, and further the optimal configuration (M) is a closest configuration to a target configuration T in respect to a probability of missing an order which falls in a distribution center $D_i$ with a probability $p_i$ at a minimum, and the IAT is configured to find the optimal configuration $M=(m_1, \ldots, m_n)$.

9. The system, as set forth in claim 8, wherein the optimization process uses a target configuration (T), an integer (K), a minimum distribution center load, the minimum order quantity $C_{MDL}$, and the vendor pack size $C_{VPS}$ as data, and wherein T and K are inputs.

10. The system, as set forth in claim 8, wherein the optimization process produces a result using:
the two matrices L and V, the optimal configuration $M=(m_1, \ldots, m_n)$, wherein both L and V are n×(K+1) matrices and wherein L(i,j) denotes a number of items in a distribution center i in the optimal configuration (M) in distributing j items, and wherein V(i,j) shows a minimum value of $D(M\backslash\backslash T)$ where $m_1=L(i, j)$, $m_l=0$ for all i<l, and $\Sigma_{l=1}^{n} m_l = j$, and where $D(M\backslash\backslash T)$ is the probability of missing the order based on a current configuration M and the target configuration T, and the order is missed either in (a) a last distribution center of the one or more distribution centers or (b) a remainder of the one or more distribution centers, and wherein the sub-problem related to i,j is defined as (a) V(i,j) is the minimum value of $D(M\backslash\backslash T)$ for all configurations M satisfying a condition of the sub-problem, and (b) L(i,j) represents the number of items in the distribution center i.

11. A method comprising:
providing, a computer network system using one or more processors, for output to distribution centers of a retailer, wherein the retailer having one or more distribution centers and one or more vendors to supply one or more items to the one or more distribution centers, wherein:
the output comprises at least an executable purchase order; and
the computer network system comprises an allocation server in data communication with an inventory allocation tool server (IAT server) to allow an allocation system to input information into an inventory allocation tool (IAT) that uses an optimization process; and
ordering, by an automated replenishment system an order quantity of an item of the one or more items from a vendor of the one or more vendors based on vendor constraints comprising a minimum order quantity (MOQ) and a vendor pack size for the item;
providing, with the allocation system, the allocation system comprising a smart allocation engine configured to apply one or more allocation policies of the retailer applicable to the one or more items, the allocation system configured to allocate the order quantity of the item based on an allocation policy of the one or more allocation policies of the retailer, the allocation policy comprising constraints for a distribution of the order quantity of the item to specific distribution centers of the one or more distribution centers based on allocation percentages associated with the one or more distribution centers and quantities of the item as determined in the allocation policy for the item associated with the specific distribution centers of the one or more distribution centers;
inputting, with the computer network system, wherein the IAT is configured to:
(a) receive, via the smart allocation engine, the allocation policy of the retailer, the allocation policy comprising the allocation percentages for the item to be allocated to each of the specific distribution centers of the one or more distribution centers;
(b) receive the order quantity of the item based on the vendor constraints for the one or more items to be ordered, wherein the vendor constraints comprise the MOQ and the vendor pack size as inputs:
(c) receive the optimization process configured to optimize the distribution of the order quantity of the item among the specific distribution centers that prioritizes the distribution of the order quantity based on the vendor constraints over the allocation percentages in the allocation policy when following the allocation percentages requires ordering a larger quantity of the item than is recommended in the allocation policy, wherein a system deviates from the allocation percentages in the allocation policy by adjusting the allocation percentages based on the vendor constraints; and
(d) output the executable purchase order over the computer network system for each specific distribution centers of the one or more distribution centers, wherein the order quantity of the item ordered is within a recommended quantity of the allocation policy.

12. The method, as set forth in claim 11, further comprising the IAT server, wherein the IAT server comprises the IAT and is in data communication with the one or more distribution centers.

13. The method, as set forth in claim 12, wherein a distribution server for each distribution center of the one or more distribution centers coupled to the IAT server and allowing each distribution center to receive an output of the IAT as the executable purchase order for the each distribution center that ordered the item.

14. The method, as set forth in claim 12, wherein an inputting system further comprises a merchandise planner team comprising an inputting server coupled to the IAT and allowing either one of the automated replenishment system or the merchandise planner team to input the order quantity of the item.

15. The method, as set forth in claim 12, wherein:
the allocation system is in data communication with the allocation server coupled to the IAT server; and
the IAT server is further configured to recommend the allocation percentages for the specific distribution centers to be inputted for the item of the one or more items.

16. The method, as set forth in claim 11, further comprising a vendor server in data communication with the IAT server and allowing the vendor of the one or more vendors to input the MOQ and the vendor pack size for the item of the one or more items.

17. The method, as set forth in claim 11, further comprising configuring the optimization process into the IAT to find an optimal configuration (M) for the order quantity.

18. The method, as set forth in claim 11, wherein the optimization process solves a problem recursively, to fill up two matrices L, V that when fully filled leads to an optimal solution comprising a two nested loop, where M is used for both current configurations for a sub-problem related to i,j, wherein the two nested loop in the optimization process is depicted as:

```
for i = 2 to n with step size 1 do
|   q = Σ_{l=1}^{i} t_l
|   q' = q - t_i
|   for j = c_MDL to K with step size c_VPS do
|   |
|   |       V(i, j) = min{(q'/q)V(i-1, j-v) + (t_i/q)χ((t_i-v)/t_i)}     (4)
|   |
|   |       for all values of v such that v = 0 or,
|   |
|   |       c_MDL ≤ v ≤ j and v is a multiple of c_VPS}
|   |
|   |       L(i, j) = v* where v* minimizes the above equation,
|   |       i.e. Equation 4.
|   end
end
currentItemCount = K
for i = n to 1 with step size -1 do
|   m_i = L(i, currentItemCount)
|   currentItemCount = currentItemCount - m_i
end
return M = (m_1, . . . , m_n)
``` wherein the IAT uses a minimum order quantity $C_{MDL}$, and a vendor pack size $C_{VPS}$, to find an optimal configuration $M=(m_1, \ldots, m_n)$ such that $m_i$ is an integer value and is a multiple of the vendor pack size $C_{VPS}$ and if $m_i>0$ then $m_i$ is at least as large the MOQ, for all $i=1, \ldots, n$, and further the optimal configuration (M) is a closest configuration to a target configuration T in respect to a probability of missing an order which falls in a distribution center $D_i$ with a probability $p_i$ at a minimum, and the IAT is configured to find the optimal configuration $M=(m_1, \ldots, m_n)$.

19. The method, as set forth in claim 18, wherein the optimization process uses a target configuration (T), an integer (K), minimum distribution center load, the minimum order quantity $C_{MDL}$, and the vendor pack size $C_{VPS}$ as data for the optimization process, and wherein T and K are inputs.

20. The method, as set forth in claim 18, wherein the optimization process produces a result using:

the two matrices L and V, the optimal configuration $M=(m_1, \ldots, m_n)$, wherein both L and V are $n \times (K-1)$ matrices and wherein L(i,j) denotes a number of items in distribution center i in the optimal configuration (M) in distributing j items, and wherein V(i,j) shows a minimum value of $D(M\backslash\backslash T)$ where $m_1=L(i, j)$, $m_l=0$ for all $i<l$, and $\Sigma_{l=1}^{n} m_l=j$, and where $D(M\backslash\backslash T)$ is the probability of missing the order based on a current configuration M and the target configuration T, and the order is missed either in a last distribution center of the one or more distribution centers or a remainder of the one or more distribution centers, and wherein the sub-problem related to i,j is defined as (a) V(i,j) is the minimum values of $D(M\backslash\backslash T)$ for all configurations M satisfying a condition of the sub-problem and (b) L(i,j) represents the number of items in the distribution center i.

21. One or more non-transitory computer-readable storage media, having computer-executable instructions embodied thereon, wherein when executed by at least one processor, the computer-executable instructions cause the processor to:
provide output to distribution centers of a retailer, wherein:
the retailer having at least one or more distribution centers and one or more vendors to supply one or more items to the at least one or more distribution centers, wherein the output comprises at least an executable purchase order;
a computer network system comprises an allocation server in data communication with an inventory allocation tool server (IAT server) to allow an allocation system to input information into an inventory allocation tool (IAT) communicatively coupled to the at least one or more distribution centers, the one or more vendors, an inputting system, the allocation system, and an optimization process; and
allocate, the allocation system comprising a smart allocation engine configured to apply one or more allocation policies of the retailer applicable to the one or more items, the allocation system configured to allocate the order quantity of the item based on an allocation policy of the one or more allocation policies of the retailer, the allocation policy comprising constraints for a distribution of the order quantity of the item to specific distribution centers of the at least one or more distribution centers based on allocation percentages associated with the at least one or more distribution centers and quantities of the item as determined in the allocation policy for the item associated with the specific distribution centers of the at least one or more distribution centers, wherein the IAT is configured to:
(a) receive, via the smart allocation engine, the allocation policy of the retailer, the allocation policy comprising the allocation percentages for the item to be allocated to each of the specific distribution centers of the at least one or more distribution centers;
(b) receive the order quantity of the item based on the vendor constraints for the one or more items to be ordered, wherein the vendor constraints comprise the MOQ and the vendor pack size as inputs:
(c) receive the optimization process configured to optimize the distribution of the order quantity of the item among the specific distribution centers that prioritizes the distribution of the order quantity based on the vendor constraints over the allocation percentages in the allocation policy when following the allocation percentages requires ordering a larger quantity of the item than is recommended by the allocation policy, wherein a system deviates from the allocation percentages in the allocation policy by adjusting the allocation percentages based on the vendor constraints; and (d) output the executable purchase order for each specific distribution center of the at least one or more distribution centers, wherein the order quantity of the item is within a recommended quantity of the allocation policy.

* * * * *